(12) United States Patent
Esteghlal et al.

(10) Patent No.: US 7,047,798 B2
(45) Date of Patent: May 23, 2006

(54) METHOD FOR CHECKING THE OPERATIVENESS OF A TANK-VENTILATION VALVE OF A TANK-VENTILATION SYSTEM

(75) Inventors: Gholamabas Esteghlal, Stuttgart (DE); Dieter Lederer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/492,242

(22) PCT Filed: Sep. 18, 2002

(86) PCT No.: PCT/DE02/03489

§ 371 (c)(1),
(2), (4) Date: Oct. 21, 2004

(87) PCT Pub. No.: WO03/033901

PCT Pub. Date: Apr. 24, 2003

(65) Prior Publication Data

US 2005/0050949 A1    Mar. 10, 2005

(30) Foreign Application Priority Data

Oct. 11, 2001    (DE) ............... 101 50 420

(51) Int. Cl.
*G01M 15/00* (2006.01)

(52) U.S. Cl. .................... 73/118.1
(58) Field of Classification Search ........... 73/116, 73/117.2, 117.3, 118.1, 119 R, 40, 46, 47, 73/49.7
See application file for complete search history.

(56) References Cited

U.S. PATENT DOCUMENTS

| | | | |
|---|---|---|---|
| 6,082,189 A * | 7/2000 | Bayerle et al. | 73/118.1 |
| 6,755,185 B1 * | 6/2004 | Esteghlal et al. | 123/520 |
| 6,886,397 B1 * | 5/2005 | Esteghlal et al. | 73/118.1 |
| 6,889,667 B1 * | 5/2005 | Fritz et al. | 123/520 |
| 2002/0157456 A1 * | 10/2002 | Fritz et al. | 123/520 |
| 2003/0061871 A1 * | 4/2003 | Oki et al. | 73/118.1 |
| 2003/0213478 A1 * | 11/2003 | Fritz et al. | 123/520 |
| 2004/0040537 A1 * | 3/2004 | Esteghlal et al. | 123/339.1 |
| 2005/0022795 A1 * | 2/2005 | Beyer et al. | 123/516 |

FOREIGN PATENT DOCUMENTS

| | | |
|---|---|---|
| DE | 41 22 975 | 1/1993 |
| DE | 44 18 010 | 11/1995 |
| DE | 199 08 138 | 6/2000 |
| DE | 100 65 122 | 8/2002 |
| EP | 1 013 917 | 6/2000 |
| JP | 09 021 359 | 1/1997 |
| JP | 2000 45885 | 2/2000 |
| SE | 505 088 | 6/1997 |
| WO | 91 16216 | 10/1991 |

* cited by examiner

*Primary Examiner*—Eric S. McCall
(74) *Attorney, Agent, or Firm*—Kenyon & Kenyon, LLP

(57) ABSTRACT

A method for checking the operativeness of a tank-ventilation valve of a tank-ventilation system of a motor vehicle is characterized by the following steps: the tank-ventilation valve is triggered in a stepped manner in a preselectable working point; the intake-manifold pressure ($p_{intake\ manifold}$) is measured and modeled in the process; the measured intake-manifold pressure ($p_{intake\ manifold}$) is compared to the modeled intake-manifold pressure and an operative tank-ventilation valve assumed if a correlation within preselected limits is given; otherwise, a defective tank-ventilation valve is assumed.

5 Claims, 2 Drawing Sheets

METHOD FOR CHECKING THE OPERATIVENESS OF A TANK-VENTILATION VALVE OF A TANK-VENTILATION SYSTEM

FIELD OF THE INVENTION

The present invention relates to a method for checking the operativeness of a tank-ventilation valve of a tank-ventilation system of a motor vehicle.

BACKGROUND INFORMATION

The tank-ventilation valve of a tank-ventilation system of a motor vehicle, constituting a component that influences the exhaust gas, must be checked for its operativeness within the framework of the on-board diagnosis (OBD). From the German Published Patent Application No. 41 22 975 a method for ascertaining the operativeness of a tank-ventilation system can be gathered in which the signals for the volume flow of the tank-ventilation valve and the signals for the pressure differential between the tank interior and the ambient pressure are subjected to a cross-covariance analysis. The mentioned signals are formed by a high pass prior to the generation of the cross-covariance function, and the maximum or the averaged value of the cross-covariance function with respect to the product of the two input variables is calculated. A variance measure is generated for the signal of the volume flow through the tank-ventilation valve and a transmission coefficient calculated from the variance measure and the averaged value or maximum. If the transmission range is within a predefined range, the tank-ventilation system is considered operative. One advantage of this method is its independence from tank-pressure variations that are not due to changes in the volume flow through the tank-ventilation valve. Specifically, these are changes that are attributable to sudden gas formation in the tank, such as may be caused by sloshing fuel.

It is also known to implement the check of the tank-ventilation valve by controlling the tank-ventilation valve in idling in a sufficiently stable working point. Simultaneously, the change in the mixture composition and the change in the energy flow via the throttle valve, which represents the product of the air-mass flow via the throttle valve and the ignition-angle efficiency factor, are observed. Conclusions concerning an operative tank-ventilation valve are drawn as a function of this observation. It is problematic here that the check may be registered as a distraction by the driver of the vehicle, for example when a change in the rotational speed occurs.

SUMMARY OF THE INVENTION

It is an object of the present invention to further develop a method for checking the operativeness of a tank-ventilation valve of the type mentioned in the introduction, in such a way that the check procedure is not noticed by the driver of a motor vehicle and, in particular, that the check may also be implemented outside of idling.

To solve this objective, the method of the present invention for checking the operativeness of a tank-ventilation system of a motor vehicle is characterized by the following steps:
the tank-ventilation valve is triggered in a pulsed manner in a preselectable working point;
the intake-manifold pressure is measured and modeled in the process;
the measured intake-manifold pressure is compared to the modeled intake-manifold pressure and an operative tank-ventilation valve assumed if a correlation within predefined limits is given; otherwise, a defective tank-ventilation valve is assumed.

Due to the pulsed triggering of the tank-ventilation valve, there is very low interference potential, which is virtually undetectable by the driver. Moreover, in contrast to other known methods for checking the operativeness of the tank-ventilation valve, a check of the tank-ventilation valve is also possible outside of idling.

A frequency analysis of the measured and modeled intake-manifold pressures is preferably implemented to compare the measured and modeled intake-manifold pressures.

The pulsed triggering is preferably carried out using preselectable values of the frequency and the pulse duty factor with short opening durations.

The working point is selected such that it is stable within predefinable limits. The working point may lie either within idling operation or also outside of it.

In an advantageous embodiment of the method, the method steps are implemented during triggering of the tank-ventilation value in active tank ventilation. Tank ventilation is used to desorb hydrocarbons previously adsorbed in the activated charcoal filter and must be carried out at regular intervals due to the limited storage capacity of the activated charcoal filter. Tank-ventilation is active for the predominant part of engine operation. Utilizing phases of active tank ventilation is advantageous insofar as no additional time must be expended during engine operation for the diagnosis of the tank-ventilation valve, so that more time is available for other diagnostic functions.

DETAILED DESCRIPTION

Figure 1:
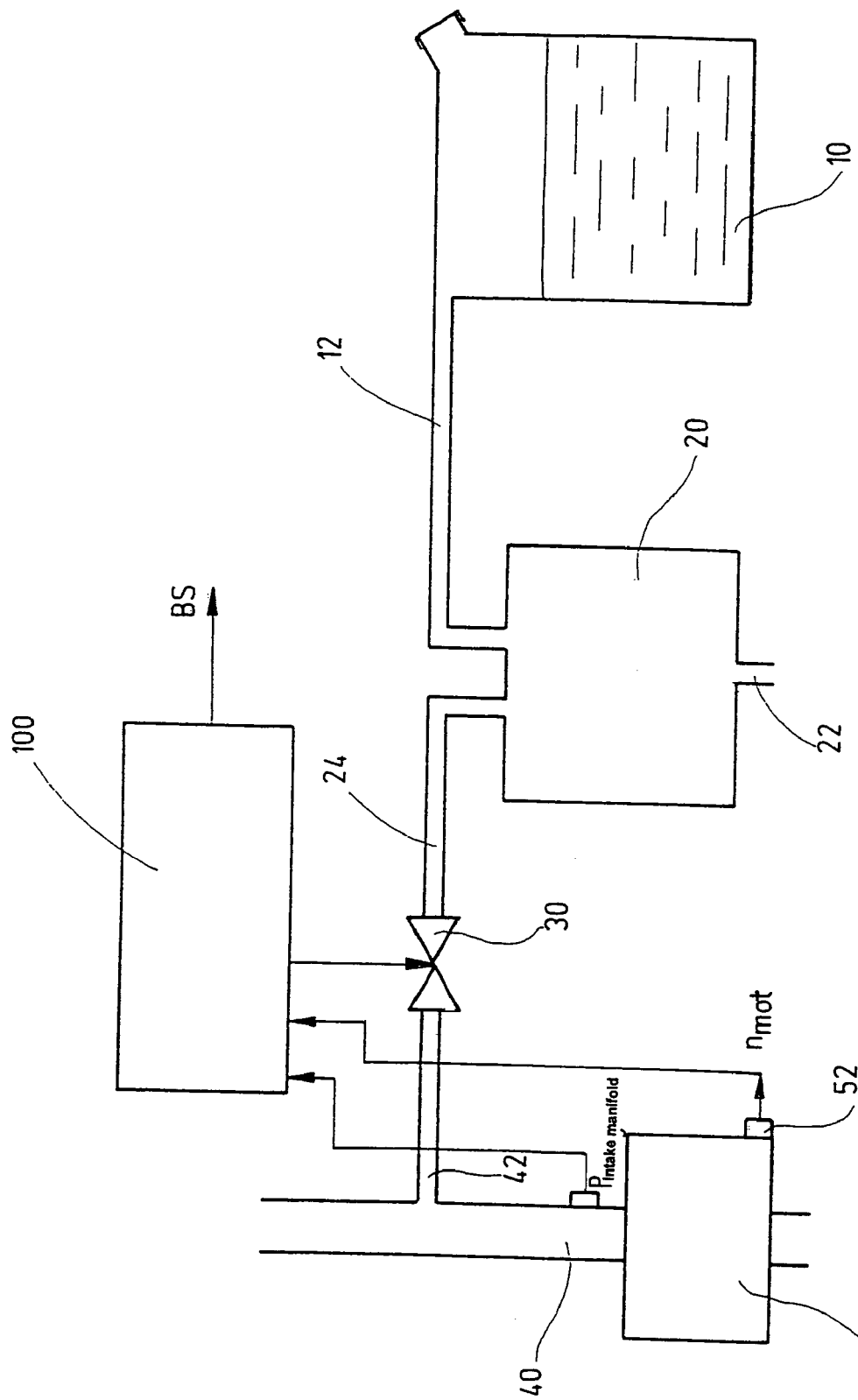
FIG. 1 shows a schematic representation of a tank-ventilation system having a device for checking the operativeness of the tank-ventilation valve.

A tank-ventilation system, shown in FIG. 1, includes a tank 10, an adsorption filter 20, such as an activated charcoal filter, which is connected to tank 10 via a tank-connection line 12 and has a vent line 22 able to be connected to the environment, as well as a tank-ventilation valve (TVV) 30, which is connected on one side to adsorption filter 20 via a valve line 24 and on the other side to an intake manifold 40 of an internal combustion engine 50 via a valve line 42.

Due to evaporation, hydrocarbons form in tank 10, which deposit in adsorption filter 20. To regenerate adsorption filter 20, tank-ventilation valve 30 is opened, so that air from the atmosphere is drawn in through adsorption filter 20, because of the vacuum pressure prevailing in intake manifold 40, drawing the hydrocarbons deposited in adsorption filter 20 into intake manifold 40 and conveying them to internal combustion engine 50.

Figure 2:
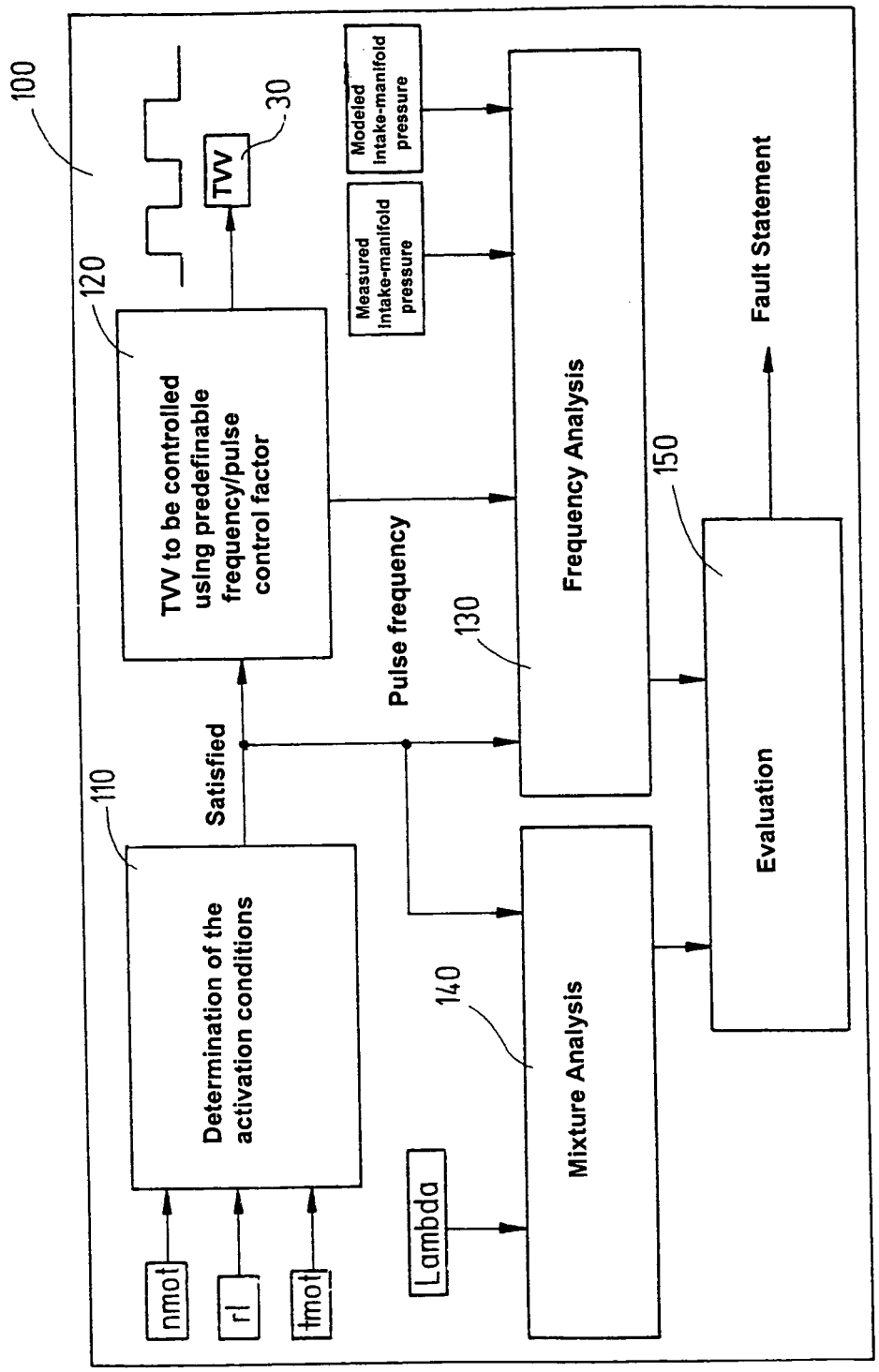
FIG. 2 shows a schematic flow chart in block form for the device shown in FIG. 1 for checking the operativeness of the tank-ventilation valve.

A device 100, which is described in greater detail in connection with FIG. 2 in the following, is provided to check the operativeness of tank-ventilation valve 30.

Device 100 includes a first means 110 to determine the activation conditions as a function of rotational speed $n_{mot}$ of the internal combustion engine, which is detected by a sensor 52, of load signal r1 as well as additional variables, such as engine temperature $t_{mot}$.

As soon as the activation conditions have been met, a trigger means 120 triggers tank-ventilation valve 30 in a pulsed manner using a frequency to be preselected and a pulse duty factor to be predefined. In the process, the intake-manifold pressure is both measured and modeled. Then, a frequency analysis both of the measured intake-manifold pressure as well as the modeled intake-manifold pressure is implemented in an analysis means 130, the frequency analysis being implemented as a function of the pulse frequency using which tank-ventilation valve 30 was triggered.

In another analysis means 140, a mixture analysis as a function of the lambda value is carried out. In an evaluation circuit part 150, the frequency analysis of the measured intake-manifold pressure is then compared to the frequency analysis of the modeled intake-manifold pressure, taking the implemented mixture analysis into account. If there is sufficient correlation of the two variables within preselectable limits, it is assumed that tank-ventilation valve 30 operates properly. In this case, an evaluation signal ES One is output, for example. If correlation is lacking, an evaluation signal zero is emitted, which may lead to the conclusion that tank-ventilation valve 30 is not working correctly.

The described method may also be implemented outside of idle operation. It must merely be carried out in a sufficiently stable working point. Since the method, unlike the known methods for checking the operativeness of the tank-ventilation valve, does not require successive triggering of the tank-ventilation over a relatively long interval up to its full opening, but uses a pulsed triggering at short opening times instead, the interference potential, such as a change in the rotational speed, able to be registered by the driver is only negligible.

The pulsed triggering is preferably carried out using preselectable values of the frequency and the pulse duty factor with short opening durations. In this way, a partial opening of the tank-ventilation valve may be simulated. For instance, the method may also be implemented very advantageously during triggering of tank-ventilation valve 30, which occurs anyway when tank ventilation is active.

What is claimed is:

1. A method for checking an operativeness of a tank-ventilation valve of a tank-ventilation system of a motor vehicle, comprising:
   triggering the tank-ventilation valve in a pulsed manner in a predefinable working point;
   measuring and modeling an intake-manifold pressure to produce a measured intake-manifold pressure and a modeled intake-manifold pressure;
   comparing the measured intake-manifold pressure to the modeled intake-manifold pressure to determine a correlation therebetween;
   assuming that the tank-ventilation valve is operative if the correlation is withing predefined limits; and
   assuming that the tank-ventilation valve is defective if the correlation is outside the predefined limits, wherein:
   the method is performed during a triggering of the tank-ventilation valve for active tank ventilation.

2. The method as recited in claim 1, further comprising:
   performing a a frequency analysis of the measured intake-manifold pressure and the modeled intake-manifold pressure.

3. The method as recited in claim 1, wherein:
   the pulsed triggering of the tank-ventilation valve is implemented using preselectable values of a frequency and a pulse duty factor with short opening durations.

4. The method as recited in claim 1, further comprising:
   selecting the preselectable working point such that the preselectable working point is stable within the preselectable limits.

5. The method as recited in claim 4, further comprising:
   selecting the preselectable working point such that the preselectable working point lies one of within and outside of idle operation.

* * * * *